US 10,583,729 B2
(12) United States Patent
Shioiri et al.

(10) Patent No.: US 10,583,729 B2
(45) Date of Patent: Mar. 10, 2020

(54) SELECTABLE ONE-WAY CLUTCH

(71) Applicants: TOYOTA JIDOSHA KABUSHIKI KAISHA, Toyota-shi, Aichi-ken (JP); Means Industries, Inc., Saginaw, MI (US)

(72) Inventors: Hiroyuki Shioiri, Yokohama (JP); Hiroyuki Shibata, Odawara (JP); Shotaro Kato, Shizuoka (JP); Mitsuaki Tomita, Susono (JP); Yuki Kurosaki, Susono (JP); Brice Pawley, Midland, MI (US)

(73) Assignees: TOYOTA JIDOSHA KABUSHIKI KAISHA, Toyota-shi (JP); Means Industries, Inc., Saginaw, MI (US)

( * ) Notice: Subject to any disclaimer, the term of this patent is extended or adjusted under 35 U.S.C. 154(b) by 248 days.

(21) Appl. No.: 15/697,008

(22) Filed: Sep. 6, 2017

(65) Prior Publication Data
US 2018/0229597 A1 Aug. 16, 2018

Related U.S. Application Data

(60) Provisional application No. 62/457,495, filed on Feb. 10, 2017.

(51) Int. Cl.
*B60K 6/383* (2007.10)
*F16D 41/12* (2006.01)
(Continued)

(52) U.S. Cl.
CPC .............. *B60K 6/383* (2013.01); *B60K 6/365* (2013.01); *B60K 6/445* (2013.01); *B60K 6/547* (2013.01);
(Continued)

(58) Field of Classification Search
CPC ............................... F16D 41/125; F16D 41/14
See application file for complete search history.

(56) References Cited

U.S. PATENT DOCUMENTS 2,947,537 A 8/1960 Littell et al.
2,959,062 A 11/1960 Looker
(Continued)

FOREIGN PATENT DOCUMENTS

WO 2016168075 A1 10/2016

OTHER PUBLICATIONS

International Searching Authority, International Search Report and the Written Opinion for International Application No. PCT/US2018/33604, dated Aug. 24, 2018.

*Primary Examiner* — Mark A Manley
(74) *Attorney, Agent, or Firm* — Hunton Andrews Kurth LLP

(57) ABSTRACT

A selectable one-way clutch includes: a pocket plate including a plurality of accommodating recess portions formed in one surface; a plurality of engaging pieces accommodated in the respective accommodating recess portions; a notch plate relatively rotatable with respect to the pocket plate, and including a plurality of engaging recess portions formed in a surface facing the one surface of the pocket plate; and a selector plate positioned between the pocket plate and the notch plate, and configured to be coaxially rotated with the notch plate to switch between: a state in which the engaging pieces rise toward the engaging recess portions; and a state in which the engaging pieces are accommodated in the respective accommodating recess portions.

8 Claims, 7 Drawing Sheets

(51) Int. Cl.

*F16D 41/14* (2006.01)
*B60K 6/445* (2007.10)
*B60K 6/365* (2007.10)
*B60K 6/547* (2007.10)
*B60W 10/02* (2006.01)

(52) U.S. Cl.

CPC .......... *F16D 41/125* (2013.01); *F16D 41/14* (2013.01); *B60W 10/02* (2013.01); *Y02T 10/6239* (2013.01)

(56) References Cited

U.S. PATENT DOCUMENTS

| | | |
|---|---|---|
| 4,050,560 A | 9/1977 | Torstenfelt |
| 4,340,133 A | 7/1982 | Biersch |
| 4,651,847 A | 3/1987 | Hermanns |
| 5,927,455 A | 7/1999 | Baker et al. |
| 6,116,394 A * | 9/2000 | Ruth .................. F16D 41/125 192/46 |
| 6,193,038 B1 | 2/2001 | Scott et al. |
| 6,244,965 B1 | 6/2001 | Klecker et al. |
| 6,290,044 B1 | 9/2001 | Burgman et al. |
| 6,607,292 B2 | 8/2003 | Gutierrez et al. |
| 6,905,009 B2 | 6/2005 | Reed et al. |
| 7,198,587 B2 | 4/2007 | Samie et al. |
| 7,258,214 B2 | 8/2007 | Pawley et al. |
| 7,275,628 B2 | 10/2007 | Pawley et al. |
| 7,344,010 B2 | 3/2008 | Felling, Jr. et al. |
| 7,484,605 B2 | 2/2009 | Pawley et al. |
| 7,491,151 B2 | 2/2009 | Maguire et al. |
| 7,643,801 B2 | 1/2010 | Piirainen |
| 7,743,678 B2 | 6/2010 | Wittkopp et al. |
| 7,766,790 B2 | 8/2010 | Stevenson et al. |
| 7,942,781 B2 | 5/2011 | Kimes |
| 7,992,695 B2 | 8/2011 | Wittkopp et al. |
| 8,051,959 B2 | 11/2011 | Eisengruber |
| 8,061,496 B2 | 11/2011 | Samie et al. |
| 8,079,453 B2 | 12/2011 | Kimes |
| 8,087,502 B2 | 1/2012 | Samie et al. |
| 8,196,724 B2 | 6/2012 | Samie et al. |
| 8,272,488 B2 | 9/2012 | Eisengruber et al. |
| 8,286,772 B2 | 10/2012 | Eisengruber |
| 8,602,187 B2 | 12/2013 | Prout |
| 8,844,693 B2 | 9/2014 | Pawley |
| 9,121,454 B2 | 9/2015 | Pawley |
| 9,181,174 B2 | 11/2015 | Beiser et al. |
| 9,188,170 B2 | 11/2015 | Prout et al. |
| 9,377,061 B2 | 6/2016 | Kimes et al. |
| 2004/0238306 A1 | 12/2004 | Reed et al. |
| 2006/0185957 A1 | 8/2006 | Kimes et al. |
| 2007/0034470 A1 | 2/2007 | Fetting, Jr. et al. |
| 2007/0278061 A1 | 12/2007 | Wittkopp et al. |
| 2008/0000747 A1 | 1/2008 | Saka |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0255773 A1 | 10/2009 | Seufert et al. |
| 2010/0018795 A1 | 1/2010 | Samie et al. |
| 2010/0022342 A1 | 1/2010 | Samie et al. |
| 2010/0200358 A1 | 8/2010 | Eisengruber et al. |
| 2010/0230226 A1 | 9/2010 | Prout |
| 2010/0025594 A1 | 10/2010 | Samie et al. |
| 2010/0252384 A1 | 10/2010 | Eisengruber |
| 2011/0177900 A1 | 7/2011 | Simon |
| 2011/0183806 A1 | 7/2011 | Wittkopp et al. |
| 2011/0192697 A1 | 8/2011 | Prout et al. |
| 2012/0090952 A1 | 4/2012 | Lee et al. |
| 2012/0145505 A1 | 6/2012 | Kimes |
| 2012/0145506 A1 | 6/2012 | Samie et al. |
| 2012/0152683 A1 | 6/2012 | Kimes |
| 2012/0152687 A1 | 6/2012 | Kimes et al. |
| 2014/0190785 A1 | 7/2014 | Fetting et al. |
| 2014/0378266 A1 | 12/2014 | Bockenstette et al. |
| 2015/0000442 A1 | 1/2015 | Kimes et al. |
| 2015/0001023 A1 | 1/2015 | Kimes et al. |
| 2015/0014116 A1 | 1/2015 | Kimes et al. |
| 2015/0105205 A1 | 4/2015 | Kurosaki et al. |
| 2015/0211587 A1 | 7/2015 | Kimes et al. |
| 2016/0047439 A1 | 2/2016 | Kimes et al. |
| 2016/0129864 A1 | 5/2016 | Essenmacher |
| 2016/0131205 A1 | 5/2016 | Essenmacher |
| 2016/0131206 A1 | 5/2016 | Essenmacher |
| 2016/0160941 A1 | 6/2016 | Green et al. |
| 2016/0160942 A1 | 6/2016 | Shioiri et al. |
| 2016/0186818 A1 | 6/2016 | Shioiri et al. |
| 2016/0223072 A1 | 8/2016 | Miyake |
| 2016/0230819 A1 | 8/2016 | Shioiri et al. |
| 2016/0245346 A1 | 8/2016 | Shioiri et al. |
| 2016/0250917 A1 | 9/2016 | Shibata et al. |
| 2016/0265605 A1 | 9/2016 | Tomita et al. |
| 2016/0273595 A1 | 9/2016 | Shioiri et al. |
| 2016/0290416 A1 | 10/2016 | Hibino |
| 2016/0339775 A1 | 11/2016 | Shioiri et al. |
| 2016/0339908 A1 | 11/2016 | Komada et al. |
| 2016/0341263 A1 | 11/2016 | Shioiri et al. |
| 2016/0348742 A1 | 12/2016 | Yasui et al. |
| 2016/0363179 A1 | 12/2016 | Yasui et al. |
| 2016/0369855 A1 | 12/2016 | Essenmacher |
| 2016/0375754 A1 | 12/2016 | Kurosaki et al. |
| 2016/0377126 A1 | 12/2016 | Essenmacher |
| 2017/0002877 A1 | 1/2017 | Shioiri et al. |
| 2017/0037914 A1 | 2/2017 | Hibino et al. |
| 2017/0050636 A1 | 2/2017 | Shibata et al. |
| 2017/0059033 A1 | 3/2017 | Shioiri et al. |
| 2017/0066317 A1 | 3/2017 | Kurosaki et al. |

* cited by examiner

SELECTABLE ONE-WAY CLUTCH

CROSS REFERENCE TO RELATED APPLICATIONS

The present application claims priority to and incorporates by reference the entire contents of U.S. provisional patent application 62/457,495, filed on Feb. 10, 2017.

BACKGROUND

The present disclosure relates to a selectable one-way clutch.

As a one-way clutch, U.S. Pat. No. 7,766,790 discloses a selectable one-way clutch including a pocket plate in which struts (engaging pieces) are accommodated in a plurality of pockets (accommodating recess portions), a notch plate in which a plurality of notches (engaging recess portions) for allowing the struts to be engaged with are formed, and a selector plate positioned between the pocket plate and the notch plate, for example.

When a hybrid vehicle (HV vehicle) in which the above-described selectable one-way clutch is mounted performs EV travel, for example, the notch plate may be rotated in a reverse direction (hereinafter, referred to as "overrun direction") to an engaging direction of the selectable one-way clutch, that is, a direction into which the strut is meshed with the notch (hereinafter, this state is referred to as "overrun").

At the time of overrun, an action in which the strut repeatedly collides with the pocket plate and the notch plate occurs. If such an action becomes intense, yaw moment (see the outlined arrow) occurs in a strut 63, as illustrated in FIGS. 8 and 9, for example, a pair of ear portions (an inner-ear portion 632 and an outer-ear portion 633) of the strut 63 repeatedly collides with side surfaces (inner walls) of a pocket 62 (an inner-ear accommodating portion 622 and an outer-ear accommodating portion 623). Therefore, tensile stress caused by the collision concentrates on root portions (corner portions 634) where the mechanical strength is smallest in the strut 63, and the life of the strut 63 may be decreased.

There is a need for a selectable one-way clutch that may suppress a decrease in the life of an engaging piece and may improve the durability.

SUMMARY

A selectable one-way clutch according to one aspect of the present disclosure includes: a pocket plate including a plurality of accommodating recess portions formed in one surface; a plurality of engaging pieces accommodated in the respective accommodating recess portions; a notch plate relatively rotatable with respect to the pocket plate, and including a plurality of engaging recess portions formed in a surface facing the one surface of the pocket plate; and a selector plate positioned between the pocket plate and the notch plate, and configured to be coaxially rotated with the notch plate to switch between: a state in which the engaging pieces rise toward the engaging recess portions; and a state in which the engaging pieces are accommodated in the respective accommodating recess portions, wherein each of the engaging piece includes: a main body portion extending in a peripheral direction of the pocket plate; a pair of ear portions extending in opposite sides to each other along a radial direction of the pocket plate from end portions of the main body portion in the peripheral direction; and corner portions where the main body portion and the ear portions intersect, the accommodating recess portion includes: a main body accommodating portion extending in the peripheral direction of the pocket plate, and in which the main body portion is accommodated; a pair of ear accommodating portions extending in opposite sides to each other along the radial direction of the pocket plate from end portions of the main body accommodating portion in the peripheral direction, and in which the ear portions are accommodated; and edge portions where the main body accommodating portion and the ear accommodating portions intersect, and an angle of the edge portion is smaller than an angle of the corner portion, the angle of the edge portion indicating an angle made by a side surface of the main body accommodating portion and a side surface of the ear accommodating portion that configure the edge portion, and the angle of the corner portion indicating an angle made by a side surface of the main body portion and a side surface of the ear portion that configure the corner portion.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

A selectable one-way clutch (hereinafter, referred to as SOWC) according to embodiments of the present disclosure will be described with reference to the drawings. Note that the present disclosure is not limited to the embodiments below. Further, configuration elements in the embodiments below include elements easily replaceable by a person skilled in the art and elements substantially the same.

First Embodiment

Figure 1:
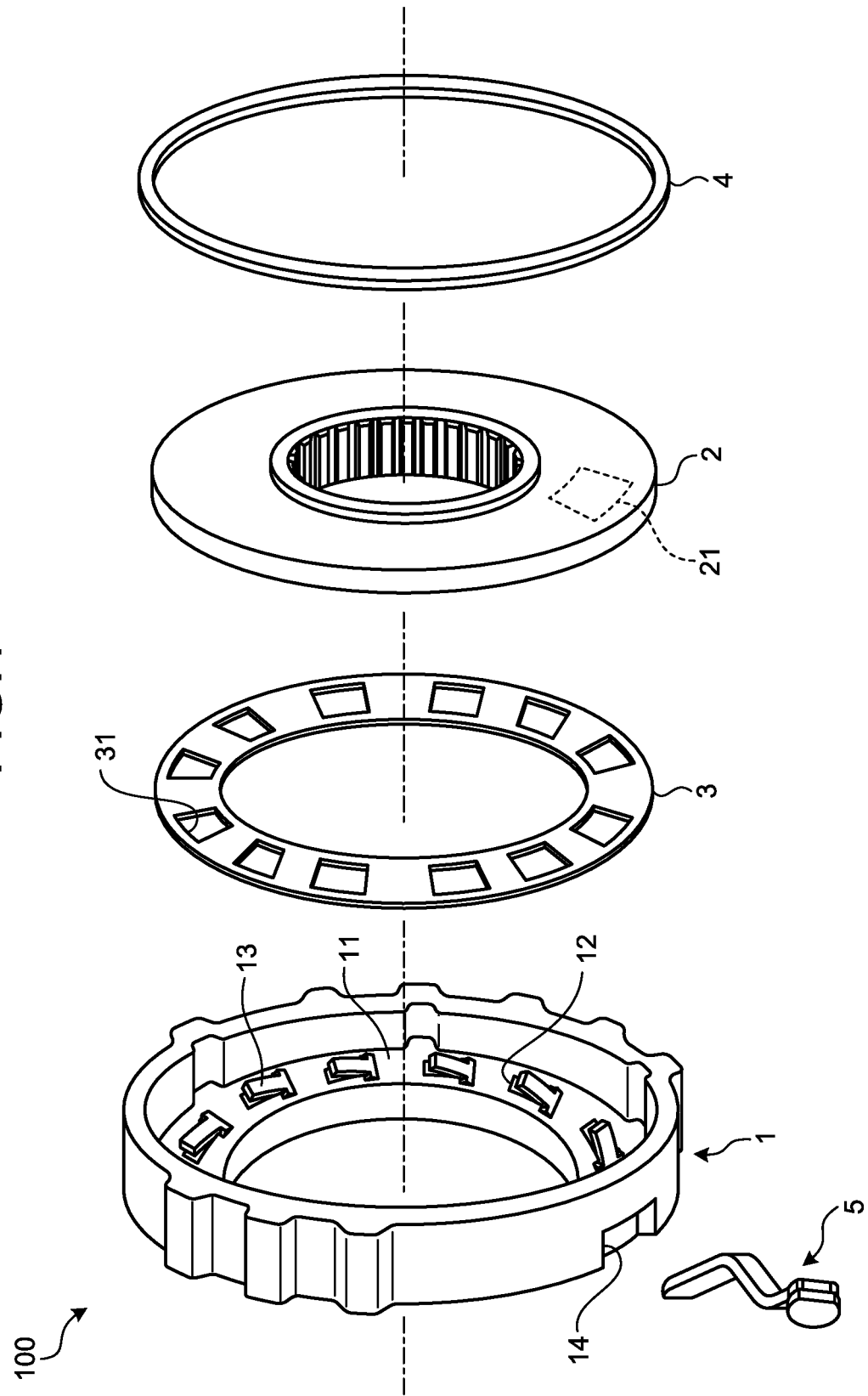
FIG. 1 is an exploded perspective view illustrating a configuration of a selectable one-way clutch according to an embodiment of the present disclosure.

An SOWC 100 according to a first embodiment is mounted on a power transmission device in a hybrid vehicle, for example, and includes a pocket plate 1, a notch plate 2, a selector plate 3, a snap ring 4, and an arm 5, as illustrated in FIG. 1. Note that the SOWC 100 uses the pocket plate 1 as a fixing member and the notch plate 2 as a rotating member, and is mainly used as a brake.

The pocket plate 1 is formed into a cylindrical shape. A plurality of pockets (accommodating recess portions) 12 depressed into a plate thickness direction of the SOWC 100 is formed in one surface of the pocket plate 1, that is, a flange portion 11 facing the notch plate 2, and plate-shaped struts (engaging pieces) 13 are accommodated inside the pockets 12. Note that the "plate thickness direction" means a direction along a rotation axis (see the long dashed short dashed line in FIG. 1) direction of the SOWC 100.

The pocket 12 is formed in a position corresponding to a notch 21 of the notch plate 2. Further, an elastic member (illustration is omitted) that biases the strut 13 toward the notch plate 2 is arranged between a bottom portion of the pocket 12 and the strut 13.

The strut 13 is configured such that a state in which one end portion of the selector plate 3 rises toward the notch 21 and a state in which the entire strut 13 including the one end portion is accommodated in the pocket 12 are switched as the selector plate 3 is coaxially rotated with the notch plate 2. Then, the strut 13 is engaged with the notch 21 under a predetermined condition to regulate the rotation of the notch plate 2, as described below.

The notch plate 2 is formed into an annular shape (hollow disk shape). Further, the notch plate 2 is arranged to face the surface of the pocket plate 1, where the pockets 12 are formed, and is configured to be relatively rotatable with respect to the pocket plate 1.

A plurality of notches (engaging recess portions 21) depressed in the plate thickness direction is formed in a surface facing the flange portion 11, of surfaces of the notch plate 2. The notch 21 is a recess portion that allows the one end portion of the strut 13 to enter therein, the one end portion having passed through a window hole 31 of the selector plate 3 and having risen toward the notch 21.

The selector plate 3 is formed into an annular shape (hollow disk shape). Further, the selector plate 3 is positioned between the pocket plate 1 and the notch plate 2. Then, the selector plate 3 is coaxially rotated with the notch plate 2 around a rotation axis by a predetermined angle to switch an engaged state and a non-engaged state, as described below. The window hole 31 penetrating the selector plate 3 in the plate thickness direction is formed in a position of the selector plate 3, the position corresponding to the pocket 12 and the strut 13 of the pocket plate 1.

Here, when the position of the window hole 31 and the position of the pocket 12 are roughly matched in a peripheral direction of the SOWC 100, the one end portion of the strut 13 is pressed by the elastic member (not illustrated), and passes through the window hole 31 and rises toward the notch 21. Then, when the notch plate 2 is rotated in an engaging direction with respect to the pocket plate 1 in the state where the end portion of the strut 13 rises toward the notch 21 in this way, the strut 13 is engaged with the notch 21, and the SOWC 100 becomes in the engaged state. In this engaged state, the strut 13 is engaged with the notch 21, so that torque is transmitted between the pocket plate 1 and the notch plate 2.

Meanwhile, when the position of the window hole 31 is shifted with respect to the position of the pocket 12 in the peripheral direction of the SOWC 100, the pocket 12 is closed by a portion of the selector plate 3, where no window hole 31 is formed, the strut 13 is pressed toward the pocket 12 by the portion where no window hole 31 is formed, and the entire strut 13 is accommodated in the pocket 12. Accordingly, the SOWC 100 becomes in the non-engaged state. In this non-engaged state, the strut 13 is not engaged with the notch 21 (the engagement between the strut 13 and the notch 21 is cancelled), so that the torque is not transmitted between the pocket plate 1 and the notch plate 2.

The snap ring 4 is used to integrally assemble the pocket plate 1, the selector plate 3, and the notch plate 2, and is formed to have an annular shape (hollow disk shape) with an outer diameter equal to the flange portion 11 of the pocket plate 1.

The arm 5 transmits drive force of an actuator (not illustrated) provided outside to the selector plate 3. The arm 5 is inserted into a notch portion 14 of the pocket plate 1, and is connected with the selector plate 3 inside the pocket plate 1. Further, a tip end of the arm 5, the tip end being exposed through the notch portion 14, is connected with the actuator (not illustrated). When the actuator is driven, the selector plate 3 is rotated through the arm 5.

Figure 8:
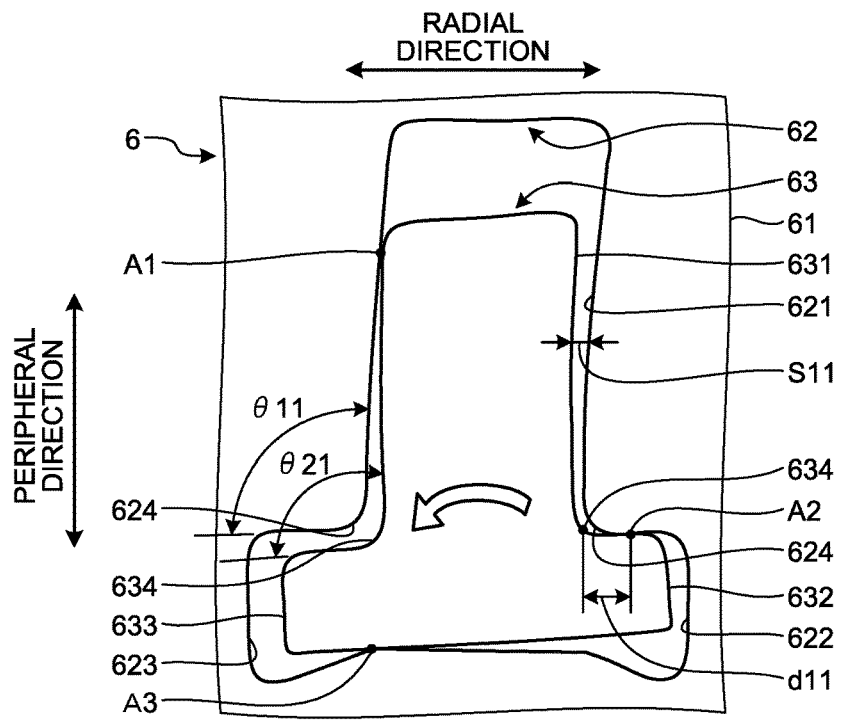
FIG. 8 is a plan view illustrating configurations of a pocket and a strut of a conventional selectable one-way clutch.
Figure 9:
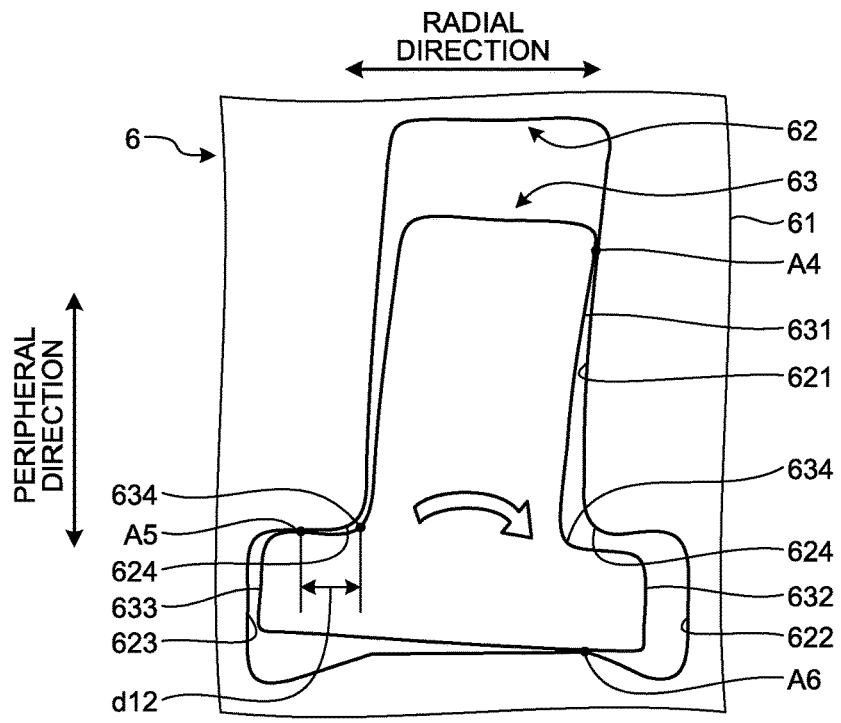
FIG. 9 is a plan view illustrating configurations of the pocket and the strut of the conventional selectable one-way clutch.

Hereinafter, configurations of a pocket and a strut of a conventional SOWC will be described with reference to FIGS. 8 and 9. Note that FIGS. 8 and 9 illustrate one pocket 62 formed in a flange portion 61 of a pocket plate 6 and one strut 63 accommodated in the pocket 62 are picked out from the conventional SOWC. Also, FIGS. 8 and 9 illustrate a state in which the entire strut 63 is accommodated in the pocket 62 for convenience of description.

The pocket 62 includes a main body accommodating portion 621, an inner-ear accommodating portion 622, an outer-ear accommodating portion 623, and edge portions 624. Further, the strut 63 includes a main body portion 631, an inner-ear portion 632, an outer-ear portion 633, and corner portions 634. Then, the main body portion 631 is accommodated in the main body accommodating portion 621, the inner-ear portion 632 is accommodated in the inner-ear accommodating portion 622, and the outer-ear portion 633 is accommodated in the outer-ear accommodating portion 623, respectively.

The pocket 62 is formed into an approximately T shape as a whole. Further, angles θ11 of the edge portions 624 that are a portion where the main body accommodating portion 621 and the inner-ear accommodating portion 622 intersect and a portion where the main body accommodating portion 621 and the outer-ear accommodating portion 623 intersect are formed into right angles. To be specific, the angles θ11 of the edge portions 624 indicate an angle made by a side surface of the main body accommodating portion 621 and a side surface of the inner-ear accommodating portion 622 that configure the edge portion 624, and an angle made by the side surface of the main body accommodating portion 621 and a side surface of the outer-ear accommodating portion 623 that configure the edge portion 624.

The strut 63 is formed into an approximately T shape as a whole, similarly to the pocket 62, and is formed slightly smaller than the shape of the pocket 62. Further, angles θ21 of the corner portions 634 that are a portion where the main body portion 631 and the inner-ear portion 632 intersect and a portion where the main body portion 631 and the outer-ear portion 633 intersect are formed into right angles. To be specific, the angles θ21 of the corner portions 634 indicate an angle made by a side surface of the main body portion 631 and a side surface of the inner-ear portion 632 that configure a corner portion 634, and an angle made by the side surface of the main body portion 631 and a side surface of the outer-ear portion 633 that configure the corner portion 634.

In the conventional SOWC including the pocket 62 and the strut 63 having such shapes, yaw moment (see the outlined arrows) illustrated in FIGS. 8 and 9 occurs at the time of overrun, as described above, and the inner-ear portion 632 and the outer-ear portion 633 repeatedly collide with side surfaces (inner walls) of the inner-ear accommodating portion 622 and the outer-ear accommodating portion 623. Accordingly, tensile stress caused by the collision concentrates on the corner portions 634 where the mechanical strength is smallest in the strut 63, and the life of the strut 63 may be decreased. Note that A1 to A6 in FIGS. 8 and 9 exemplarily illustrate collision portions of the pocket 62 and the strut 63 at the time of occurrence of the yaw moment.

Therefore, in the SOWC 100 according to the present embodiment, the shape of the pocket 12 is changed, and thus, tensile stress acting on the strut 13 is reduced. Hereinafter, specific configurations of the pocket 12 and the strut 13 of the SOWC 100 will be described with reference to FIGS. 2 and 3.

The pocket 12 includes a main body accommodating portion 121 extending in a peripheral direction of the pocket plate 1, an inner-ear accommodating portion 122 and an outer-ear accommodating portion 123 that are a pair of ear accommodating portions extending in opposite sides to each other along a radial direction of the pocket plate 1 from end portions of the main body accommodating portion 121 in the peripheral direction, and edge portions 124.

The pocket 12 is formed into an approximately T shape as a whole. Further, angles θ12 of the edge portions 124 that are a portion where the main body accommodating portion 121 and the inner-ear accommodating portion 122 intersect and a portion where main body accommodating portion 121 and the outer-ear accommodating portion 123 intersect are formed in an acute angle. To be specific, the angles θ12 of the edge portions 124 indicate an angle made by a side surface of the main body accommodating portion 121 and a side surface of the inner-ear accommodating portion 122 that configure the edge portion 124, and an angle made by the side surface of the main body accommodating portion 121 and a side surface of the outer-ear accommodating portion 123 that configure the edge portion 124. Note that it is more favorable if the angles θ12 of the edge portions 124 are closer to a right angle (90°).

The strut 13 includes a main body portion 131 extending in the peripheral direction of the pocket plate 1, an inner-ear portion 132 and an outer-ear portion 133 that are a pair of ear portions extending in opposite sides to each other along the radial direction of the pocket plate 1 from end portions of the main body portion 131 in the peripheral direction, and corner portions 134. Then, the main body portion 131 is accommodated in the main body accommodating portion 121, the inner-ear portion 132 is accommodated in the inner-ear accommodating portion 122, and the outer-ear portion 133 is accommodated in the outer-ear accommodating portion 123, respectively.

The strut 13 is formed into an approximately T shape as a whole, similarly to the pocket 12, and is formed slightly smaller than the shape of the pocket 12. Further, angles θ22 of the corner portions 134 that are a portion where the main body portion 131 and the inner-ear portion 132 intersect and a portion where the main body portion 131 and the outer-ear portion 133 intersect are formed into right angles, unlike the angles θ12 of the edge portions 124 of the pocket 12. That is, the angles θ12 of the edge portions 124 are formed smaller than the angles θ22 of the corner portions 134. To be specific, the angles θ22 of the corner portions 134 indicate an angle made by a side surface of the main body portion 131 and a side surface of the inner-ear portion 132 that configure the corner portion 134 and an angle made by the side surface of the main body portion 131 and a side surface of the outer-ear portion 133 that configure the corner portion 134. Further, the shape of the strut 13 in the present embodiment is similar to the shape of the conventional strut 63 (FIG. 8).

Figure 2:
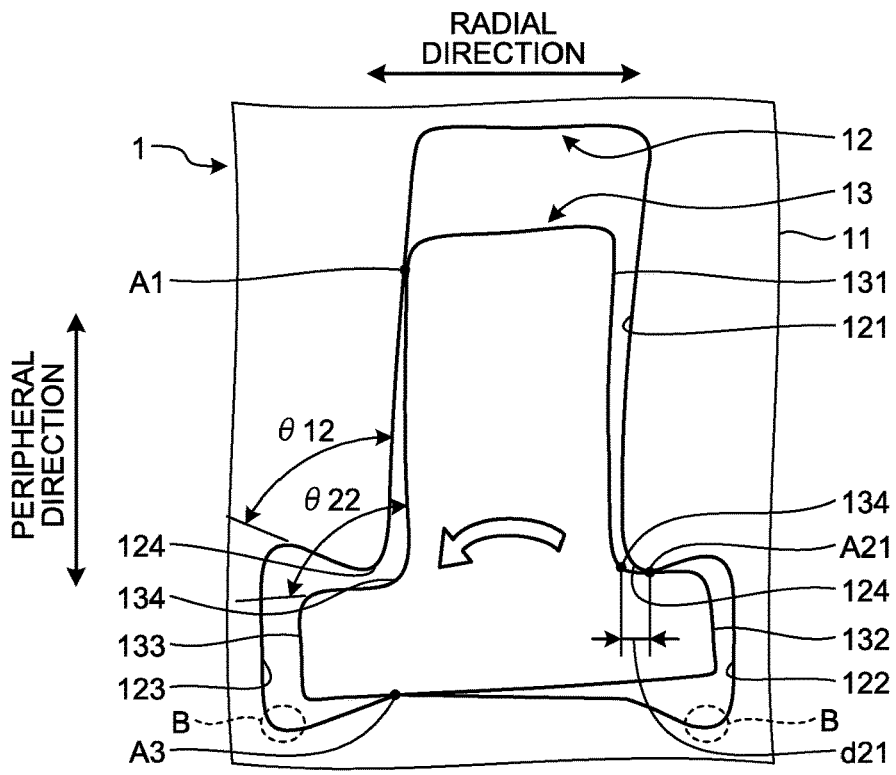
FIG. 2 is a plan view illustrating configurations of a pocket and a strut of the selectable one-way clutch according to the first embodiment of the present disclosure.
Figure 3:
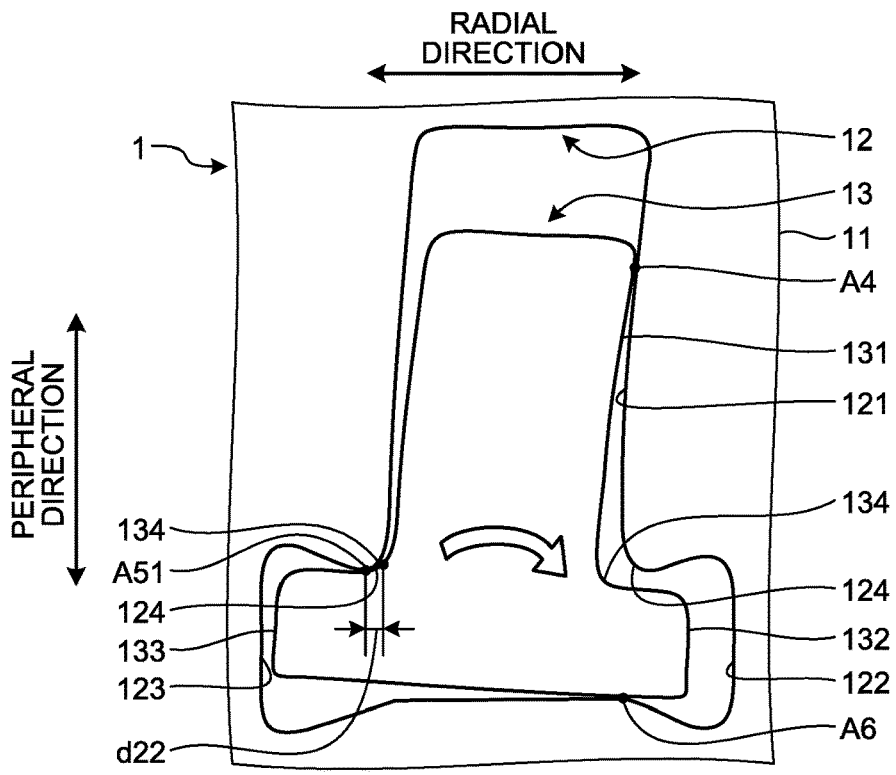
FIG. 3 is a plan view illustrating configurations of the pocket and the strut of the selectable one-way clutch according to the first embodiment of the present disclosure.

The SOWC 100 including the pocket 12 and the strut 13 having such shape may make the inner-ear portion 132 and the outer-ear portion 133 collide with the side surface of the inner-ear accommodating portion 122 and the side surface of the outer-ear accommodating portion 123, respectively, in positions closer to the corner portions 134 than the conventional SOWC (see FIGS. 8 and 9) when yaw moment (see the outlined arrows) occurs in the strut 13 at the time of overrun, as illustrated in FIGS. 2 and 3.

That is, as illustrated in FIG. 2, a distance d21 between a collision portion A21 and the corner portion 134 of the SOWC 100 is shorter than a distance d11 between a collision portion A2 and the corner portion 634 of the conventional SOWC (see FIG. 8). Further, similarly, as illustrated in FIG. 3, a distance d22 between a collision portion A51 and the corner portion 134 of the SOWC 100 is shorter than a distance d12 between a collision portion A5 and the corner portion 634 of the conventional SOWC (see FIG. 9). Therefore, the SOWC 100 has smaller tensile stress acting on the corner portions 134 of the strut 13 when the inner-ear portion 132 and the outer-ear portion 133 collide with the inner-ear accommodating portion 122 and the outer-ear accommodating portion 123, than the conventional SOWC, and thus may suppress a decrease in the life of the strut 13 and may improve the durability.

Note that many of conventionally disclosed SOWCs are used as clutches rather than brakes. In this case, not only the notch plate but also the pocket plate is rotated at the time of use. Therefore, the strut sticks to an outer side of the pocket by centrifugal force at the time of overrun, and the action of the strut repeatedly colliding with the pocket plate and the notch plate and the yaw moment itself are less likely to occur. Therefore, in the conventional SOWCs used as clutches, the angle of the edge portion 624 of the pocket 62 and the angle of the corner portion 634 of the strut 63 are typically formed into shapes close to the right angle, respectively, as illustrated in FIGS. 8 and 9, for example, from a perspective of manufacturability. That is, the conventional SOWCs used as clutches have no necessity to form the angle of the edge portion 624 of the pocket 62 and the angle of the corner portion 634 of the strut 63 into angles other than the right angles.

Meanwhile, the SOWC 100 according to the present embodiment is used as a brake, and the pocket plate 1 is not rotated at the time of use. Therefore, the SOWC 100 has the problem of occurrence of the yaw moment in the strut 13 at the time of overrun, but has solved the problem by changing the shape of the pocket 12.

Second Embodiment

An SOWC according to a second embodiment will be described with reference to FIGS. 4 and 10. Note that FIGS.

4 and 10 illustrate only a half of a strut 13 and a part of a pocket 12A for convenience of description.

Figure 10:
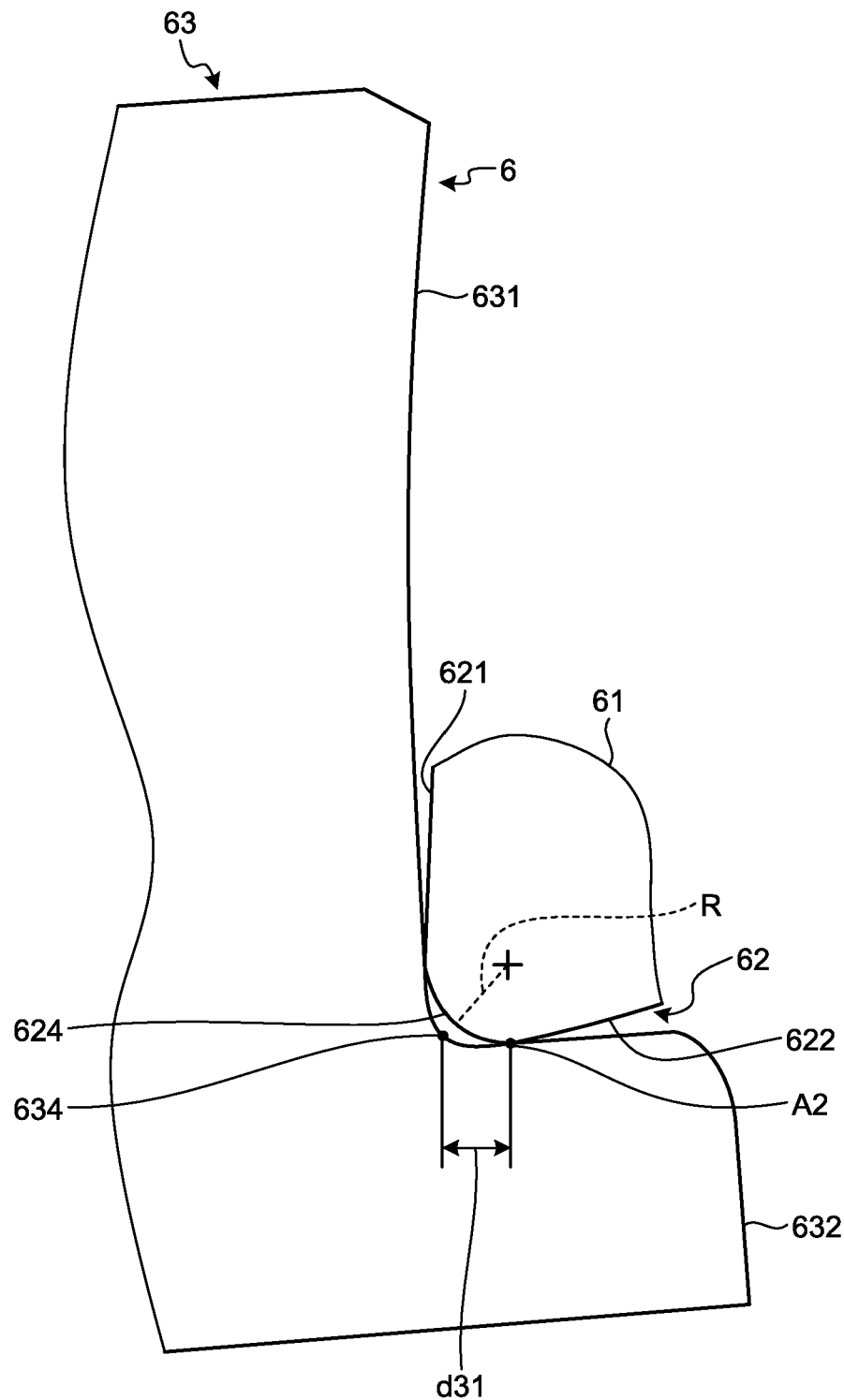
FIG. 10 is a plan view illustrating configurations of a pocket and a strut of a conventional selectable one-way clutch.

Here, as illustrated in FIG. 10, in a pocket plate 6 of a conventional SOWC, an edge portion 624 of a pocket 62 has a shape including only one arc formed of a radius of curvature R. Meanwhile, as illustrated in FIG. 4, in a pocket plate 1A of the SOWC according to the present embodiment, an edge portion 124A of the pocket 12A has a shape including a plurality of (two in FIG. 4) arcs composed of radiuses of curvature R1 and R2, that is, a composite R shape. At that time, the radius of curvature R1 is set to become larger than the conventional radius of curvature R, and the radius of curvature R2 is set to become smaller than the conventional radius of curvature R.

The SOWC including the pocket 12A and the strut 13 having such shapes may make an inner-ear portion 132 and an outer-ear portion 133 collide with a side surface of an inner-ear accommodating portion 122 and a side surface of an outer-ear accommodating portion 123, respectively, in positions closer to corner portions 134 than the conventional SOWC (see FIGS. 8 and 9) at the time of occurrence of yaw moment.

Figure 4:
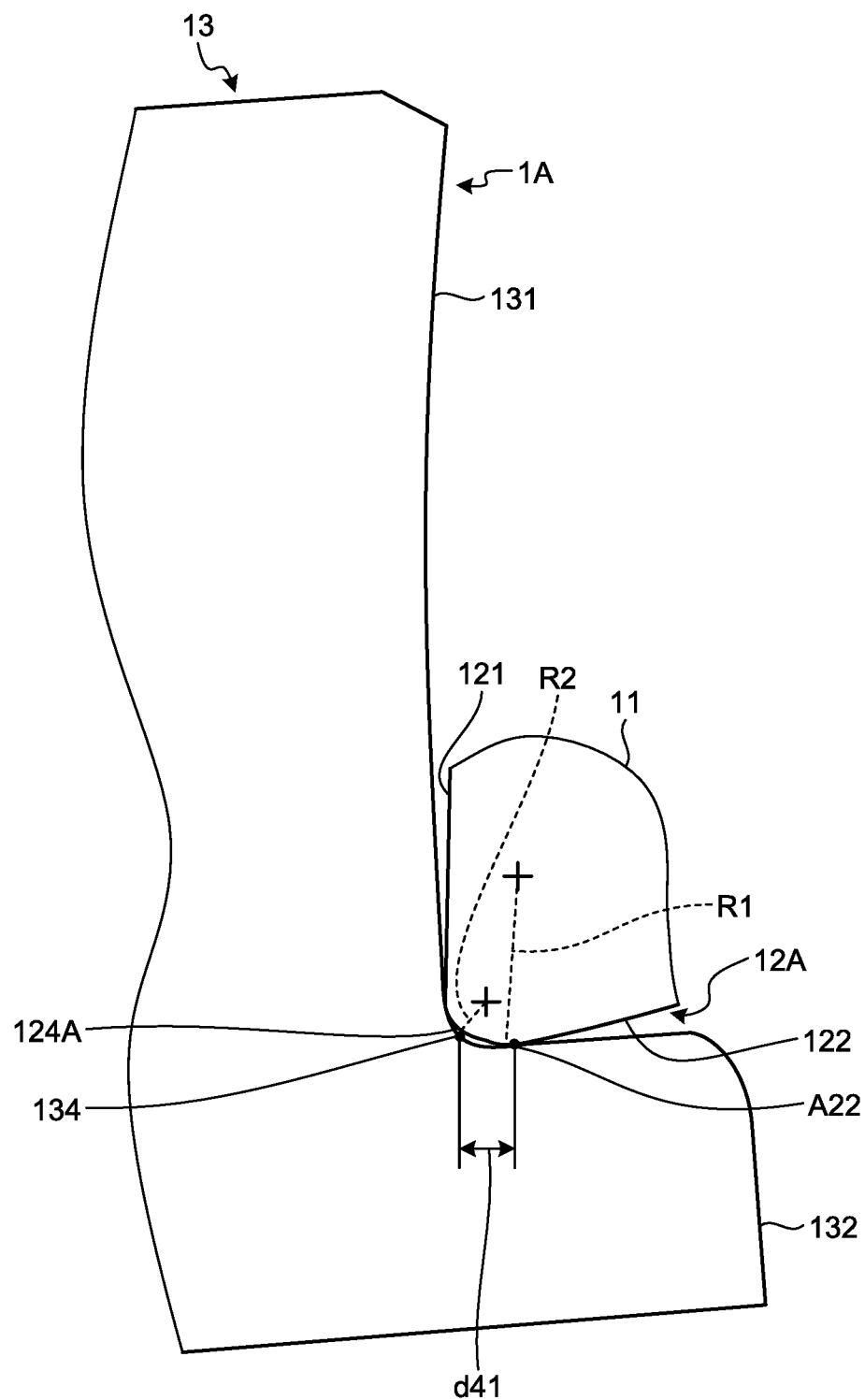
FIG. 4 is a plan view illustrating configurations of a pocket and a strut of a selectable one-way clutch according to a second embodiment of the present disclosure.

That is, as illustrated in FIG. 4, a distance d41 between a collision portion A22 and the corner portion 134 of the SOWC according to the present embodiment becomes shorter than a distance d31 between a collision portion A2 and a corner portion 634 of the conventional SOWC (see FIG. 10). Therefore, the SOWC according to the present embodiment has smaller tensile stress acting on the corner portions 134 of the strut 13 at the time of collision than the conventional SOWC, and thus may suppress a decrease in the life of the strut 13 and may improve the durability.

Further, in the SOWC according to the present embodiment, the edge portion 124A of the pocket 12A is formed into the shape including a plurality of arcs. Therefore, the SOWC according to the present embodiment may make the radius of curvature R1 of the edge portion 124A in the position of the collision portion A22 larger than the radius of curvature R of the edge portion 624 in the position of the conventional collision portion A2. Therefore, the SOWC according to the present embodiment may decrease collision surface pressure at the time of collision and may make the tensile stress acting on the corner portions 134 of the strut 13 smaller.

Third Embodiment

An SOWC according to a third embodiment will be described with reference to FIG. 5. Note that FIG. 5 illustrates only a half of a strut 13 and a part of a pocket 12A for convenience of description.

In a pocket plate 1B of the SOWC according to the present embodiment, an edge portion 124B of a pocket 12B has a shape including a plurality of (two in FIG. 5) arcs composed of radiuses of curvature R1 and R2 (composite R shape). Further, the edge portion 124B includes a linear portion 124a between the two arcs.

The SOWC including the pocket 12B and the strut 13 having such shapes may make an inner-ear portion 132 and an outer-ear portion 133 collide with a side surface of an inner-ear accommodating portion 122 and a side surface of an outer-ear accommodating portion 123, respectively, in positions closer to corner portions 134 than the conventional SOWC (see FIGS. 8 and 9) at the time of occurrence of yaw moment.

Figure 5:
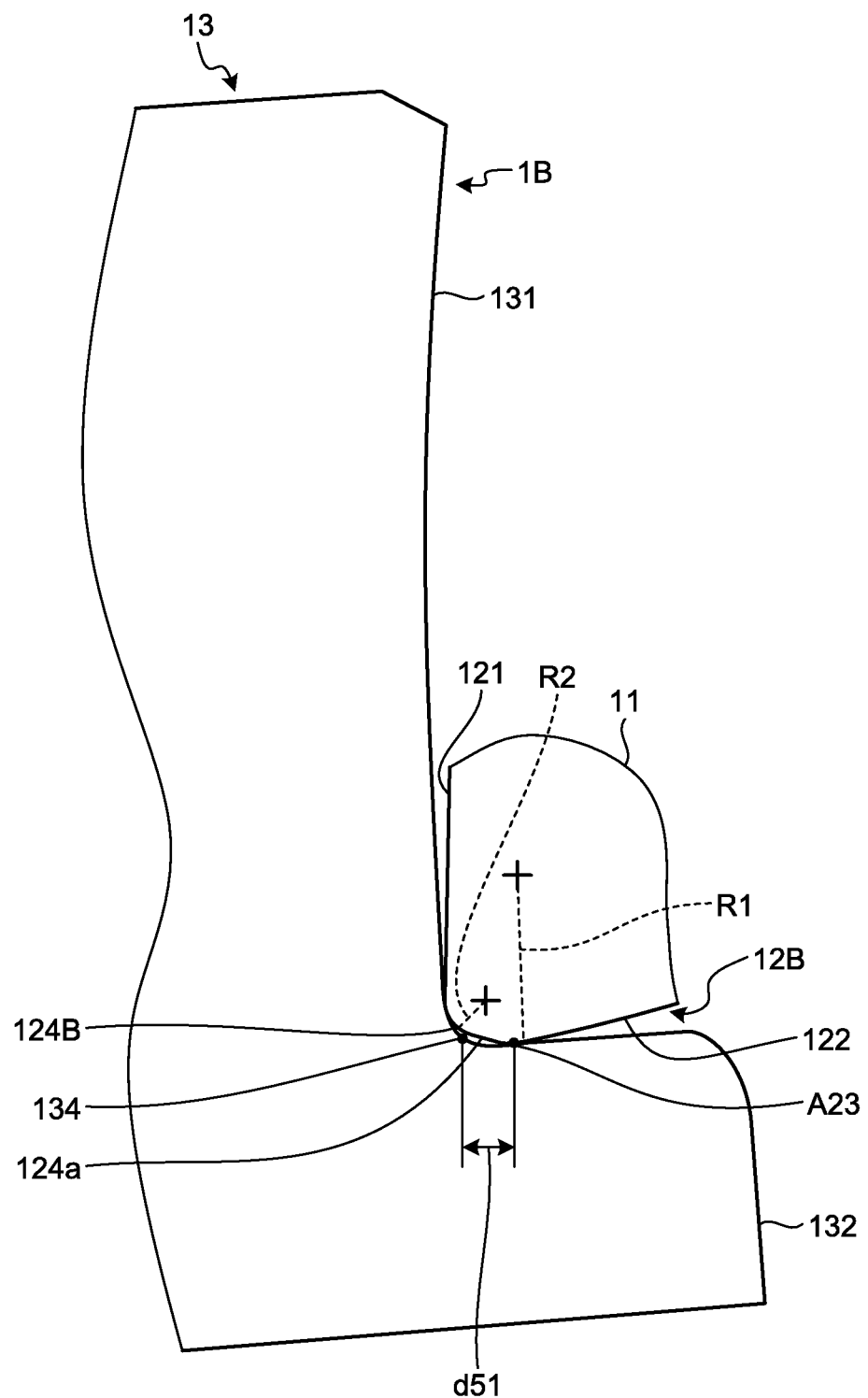
FIG. 5 is a plan view illustrating configurations of a pocket and a strut of a selectable one-way clutch according to a third embodiment of the present disclosure.

That is, as illustrated in FIG. 5, a distance d51 between a collision portion A23 and the corner portion 134 of the SOWC according to the present embodiment becomes shorter than a distance d31 between a collision portion A2 and a corner portion 634 of the conventional SOWC (see FIG. 10). Therefore, the SOWC according to the present embodiment has smaller tensile stress acting on the corner portions 134 of the strut 13 at the time of collision than the conventional SOWC, and thus may suppress a decrease in the life of the strut 13 and may improve the durability.

Further, in the SOWC according to the present embodiment, the edge portion 124B of the pocket 12B is formed into the shape including a plurality of arcs, similarly to the second embodiment. Therefore, the SOWC according to the present embodiment may decrease collision surface pressure at the time of collision. Further, the edge portion 124B of the SOWC according to the present embodiment includes the linear portion 124a having an infinite radius of curvature, and thus may further decrease the collision surface pressure when the inner-ear portion 132 and the outer-ear portion 133 collide with the linear portions 124a, for example. Therefore, according to the SOWC of the present embodiment, the tensile stress acting on the corner portions 134 of the strut 13 may be made smaller.

Fourth Embodiment

An SOWC according to a fourth embodiment will be described with reference to FIG. 6. A pocket plate 1C of the SOWC according to the present embodiment includes a pocket 12C including a main body accommodating portion 121C, an inner-ear accommodating portion 122C, an outer-ear accommodating portion 123C and edge portions 124C, and a strut 13C including a main body portion 131C, an inner-ear portion 132C, an outer-ear portion 133C, and corner portions 134C.

The pocket 12C is formed into an approximately T shape as a whole. Then, angles θ13 of the edge portions 124C are formed into right angles. Note that definition of the angles θ13 of the edge portions 124C is similar to the definition of the angles θ12 of the first embodiment. Further, the shape of the pocket 12C in the present embodiment is similar to the shape of the pocket 62 of the conventional SOWC (FIG. 8).

The strut 13C is formed into an approximately T shape, similarly to the pocket 12C, and is made slightly smaller than the shape of the pocket 12C. Then, angles θ23 of the corner portions 134C are formed into obtuse angles, unlike the angles θ13 of the edge portions 124C. That is, the angles θ13 of the edge portions 124C are formed smaller than the angles θ23 of the corner portions 134C. Note that definition of angles θ23 of the corner portions 134C is similar to the definition of the angles angle θ22 of the first embodiment. Note that it is more favorable if the angles θ23 of the corner portions 134C are closer to 180°.

Figure 6:
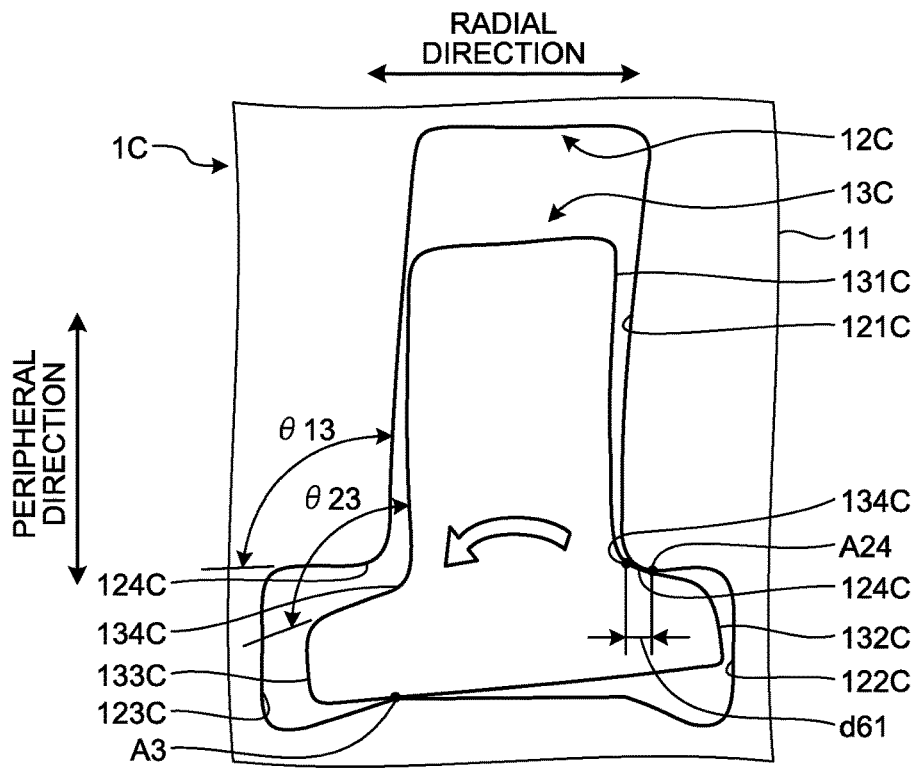
FIG. 6 is a plan view illustrating configurations of a pocket and a strut of a selectable one-way clutch according to a fourth embodiment of the present disclosure.

As illustrated in FIG. 6, the SOWC including the pocket 12C and the strut 13C having such shapes may make the inner-ear portion 132C and the outer-ear portion 133C collide with a side surface of the inner-ear accommodating portion 122C and a side surface of the outer-ear accommodating portion 123C, respectively, in positions closer to the corner portions 134C than the conventional SOWC (see FIG. 8), at the time of occurrence of yaw moment (see the outlined arrow).

That is, as illustrated in FIG. 6, a distance d61 between a collision portion A24 and the corner portion 134C of the SOWC according to the present embodiment becomes shorter than a distance d11 between a collision portion A2 and a corner portion 634 of the conventional SOWC (see FIG. 8). Therefore, the SOWC according to the present embodiment has smaller tensile stress acting on the corner portions 134C of the strut 13C at the time of collision than the conventional SOWC, and thus may suppress a decrease in the life of the strut 13C and may improve the durability.

Further, in the SOWC according to the present embodiment, the angles θ23 of the corner portions 134C of the strut 13C are formed into obtuse angles, and thus the manufacturability of the strut 13C is improved as compared with a case where the angles θ23 of the corner portions 134C are formed into right angles or acute angles, for example.

Fifth Embodiment

An SOWC according to a fifth embodiment will be described with reference to FIG. 7. A pocket plate 1D of the SOWC according to the present embodiment includes a pocket 12D including a main body accommodating portion 121D, an inner-ear accommodating portion 122D, an outer-ear accommodating portion 123D, and edge portions 124D, and a strut 13D including a main body portion 131D, an inner-ear portion 132D, an outer-ear portion 133D, and corner portions 134D.

The pocket 12D is formed into an approximately T shape as a whole. Then, angles θ14 of the edge portions 124D are formed into acute angles. Note that definition of the angles θ14 of the edge portions 124D is similar to the definition of the angles θ12 of the first embodiment. Further, it is more favorable if the angles θ14 of the edge portions 124D are closer to a right angle (90°).

Further, the inner-ear accommodating portion 122D and the outer-ear accommodating portion 123D of the pocket 12D include, in side surfaces coming in contact with tapered portions 132a and 133a described below on the strut 13D side, tapered portions 122a and 123a inclined in the same directions as the tapered portions 132a and 133a.

The strut 13D is formed into an approximately T shape as a whole, similarly to the pocket 12D, and is formed slightly smaller than the shape of the pocket 12D. Then, the angles θ24 of the corner portions 134D are formed into right angles, unlike the angles θ14 of the edge portions 124D. That is, the angles θ14 of the edge portions 124D are formed smaller than the angles θ24 of the corner portions 134D. Note that definition of the angles θ24 of the corner portions 134D is similar to the definition of the angles θ22 of the first embodiment.

Further, the inner-ear portion 132D and the outer-ear portion 133D of the strut 13D include, in side surfaces opposite to the side surfaces that configure the corner portions 134D, the tapered portions 132a and 133a inclined in a direction toward a tip end of the main body portion 131D.

Figure 7:
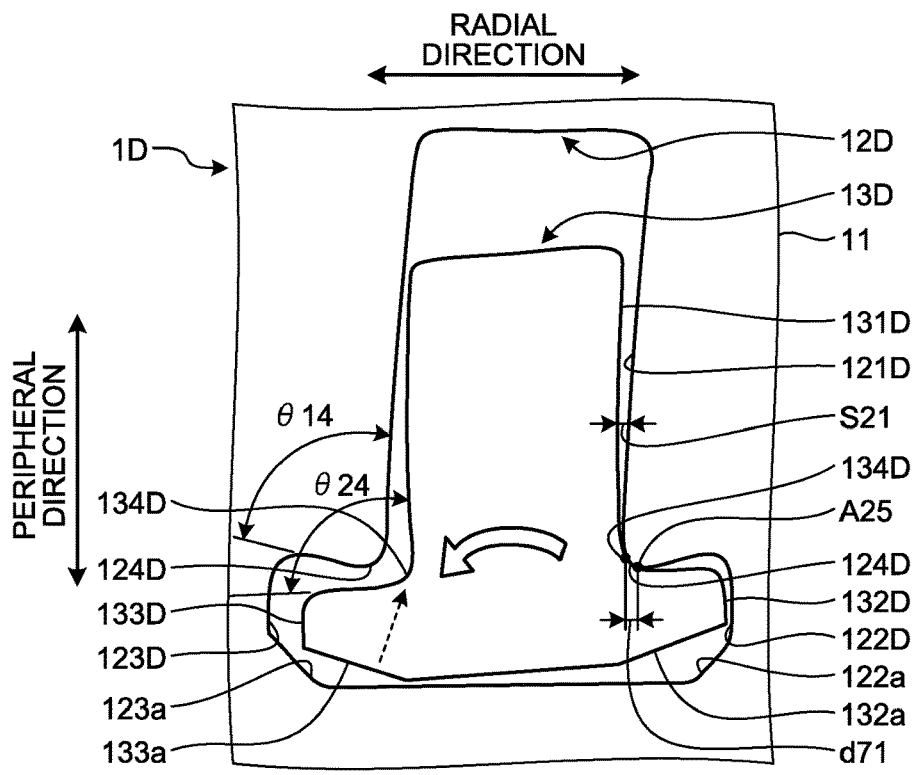
FIG. 7 is a plan view illustrating configurations of a pocket and a strut of a selectable one-way clutch according to a fifth embodiment of the present disclosure.

As illustrated in FIG. 7, in the SOWC including the pocket 12D and the strut 13D having such shapes, the tapered portion 123a of the pocket 12D and the tapered portion 133a of the strut 13D come in contact with each other at the time of occurrence of yaw moment (see the outlined arrow), for example, so that the strut 13D is moved to an opposite side of the tapered portions 123a and 133a (the right side on the sheet surface). Accordingly, a gap s21 between the main body portion 131D and the main body accommodating portion 121D becomes smaller than a conventional gap s11 (see FIG. 8). Therefore, the SOWC according to the present embodiment may make the inner-ear portion 132D and the outer-ear portion 133D collide with the side surface of the inner-ear accommodating portion 122D and the side surface of the outer-ear accommodating portion 123D, respectively, in positions closer to the corner portions 134D than the conventional SOWC.

That is, as illustrated in FIG. 7, a distance d71 between a collision portion A25 and the corner portion 134D of the SOWC according to the present embodiment becomes shorter than a distance d11 between a collision portion A2 and a corner portion 634 of the conventional SOWC (see FIG. 8). Therefore, the SOWC according to the present embodiment has smaller tensile stress acting on the corner portions 134D of the strut 13D than the conventional SOWC, and thus may suppress a decrease in the life of the strut 13D and may improve the durability.

Note that, as illustrated in FIG. 7, when the tapered portion 123a of the pocket 12D comes in contact with the tapered portion 133a of the strut 13D at the time of occurrence of yaw moment, compressive stress works on the corner portion 134D where the mechanical strength is smallest in the strut 13D, as illustrated by the broken line arrow in FIG. 7. Therefore, the life of the strut 13D is not decreased. Further, since the strut 13D is provided with the tapered portion 133a, the SOWC according to the present embodiment does not need to provide recess portions for allowing the inner-ear portion 132D and the outer-ear portion 133D to escape thereto, as illustrated by the reference signs B in FIG. 2, in the pocket 12D side. Therefore, the manufacturability of the pocket 12D is improved.

As described above, the selectable one-way clutch according to the present disclosure has been specifically described by the forms for implementing the disclosure. However, the gist of the present disclosure is not limited to the description, and should be broadly construed on the basis of the description of claims. In addition, it goes without saying that various changes and alternations based on the description are also included in the gist of the present disclosure.

For example, in FIG. 2, the angle θ12 of the edge portion 124 of the pocket 12 is formed into an acute angle, and the angle θ22 of the corner portion 134 of the strut 13 is formed into a right angle. However, the angle θ22 of the corner portion 134 may be formed into an acute angle. In this case, the angles are determined such that the angle θ12 of the edge portion 124 becomes smaller than the angle θ22 of the corner portion 134.

When a predetermined condition is satisfied, the angle θ12 of the edge portion 124 of the pocket 12 and the angle θ22 of the corner portion 134 of the strut 13 may be formed into acute angles, and may be the same angle, in FIG. 2. In this case, material and surface states of the pocket 12 and the strut 13 are adjusted such that frictional force of a contact portion between the pocket 12 and the strut 13 becomes small. Accordingly, the SOWC according to the present embodiment may make the inner-ear portion 132 and the outer-ear portion 133 slide and enter the inner-ear accommodating portion 122 and the outer-ear accommodating portion 123 when yaw moment occurs in the strut 13 at the time of overrun, and thus may make the inner-ear portion 132 and the outer-ear portion 133 collide with a side surface of the inner-ear accommodating portion 122 and a side surface of the outer-ear accommodating portion 123, respectively in positions closer to the corner portions 134 than the conventional SOWC (see FIGS. 8 and 9).

Further, in FIG. 6, the angle θ13 of the edge portion 124C of the pocket 12C is formed into a right angle and the angle θ23 of the corner portion 134C of the strut 13C is formed into an obtuse angle. However, the angle θ13 of the edge portion 124C may be formed into an acute angle.

Note that, in FIG. 6, the angle θ13 of the edge portion 124C of the pocket 12C is formed into a right angle and the angle θ23 of the corner portion 134C of the strut 13C is formed in to an obtuse angle. However, the angle θ13 of the edge portion 124C may be formed into an obtuse angle. In this case, the angles are determined such that the angle θ13 of the edge portion 124C becomes smaller than the angle θ23 of the corner portion 134C.

Further, in FIGS. 2 and 7, the angles θ12 and θ14 of the edge portions 124 and 124D of the pockets 12 and 12D are formed into acute angles, and the angles θ22 and θ24 of the corner portions 134 and 134D of the struts 13 and 13D are formed into right angles. However, the angles θ22 and θ24 of the corner portions 134 and 134D may be formed into obtuse angles.

Even in the above configurations, the distance between the collision portion and the corner portion of the strut may be made shorter than that of the conventional case, similar to the SOWCs according to the first to fifth embodiments. Therefore, the tensile stress acting on the corner portions becomes small, and the decrease in the life of the strut may be suppressed and the durability may be improved. Further, when either the angle of the corner portion or the angle of the edge portion is formed into the obtuse angle, the manufacturability of the strut and the pocket is improved as compared with a case where the angle of the corner portion or the angle of the edge portion is formed into a right angle or an acute angle.

According to the selectable one-way clutch according to the present disclosure, the tensile stress acting on the corner portion of the engaging piece becomes small when the ear portion collides with the ear accommodating portion, and thus the decrease in the life of the engaging piece may be suppressed, and the durability may be improved.

According to the disclosure, a selectable one-way clutch may include: a pocket plate including a plurality of accommodating recess portions formed in one surface; a plurality of engaging pieces accommodated in the respective accommodating recess portions; a notch plate relatively rotatable with respect to the pocket plate, and including a plurality of engaging recess portions formed in a surface facing the one surface of the pocket plate; and a selector plate positioned between the pocket plate and the notch plate, and configured to be coaxially rotated with the notch plate to switch between: a state in which the engaging pieces rise toward the engaging recess portions; and a state in which the engaging pieces are accommodated in the respective accommodating recess portions, wherein each of the engaging piece includes: a main body portion extending in a peripheral direction of the pocket plate; a pair of ear portions extending in opposite sides to each other along a radial direction of the pocket plate from end portions of the main body portion in the peripheral direction; and corner portions where the main body portion and the ear portions intersect, the accommodating recess portion includes: a main body accommodating portion extending in the peripheral direction of the pocket plate, and in which the main body portion is accommodated; a pair of ear accommodating portions extending in opposite sides to each other along the radial direction of the pocket plate from end portions of the main body accommodating portion in the peripheral direction, and in which the ear portions are accommodated; and edge portions where the main body accommodating portion and the ear accommodating portions intersect, and an angle of the edge portion is smaller than an angle of the corner portion, the angle of the edge portion indicating an angle made by a side surface of the main body accommodating portion and a side surface of the ear accommodating portion that configure the edge portion, and the angle of the corner portion indicating an angle made by a side surface of the main body portion and a side surface of the ear portion that configure the corner portion.

Accordingly, when yaw moment occurs in the engaging piece at the time of overrun, the selectable one-way clutch may make the ear portions of the engaging piece collide with the side surfaces of the ear accommodating portions of the accommodating recess portion in the positions close to the corner portions in the engaging piece. Therefore, a distance between a collision portion of the ear portion and the ear accommodating portion, and the corner portion where mechanical strength is smallest in the engaging piece becomes short, and thus tensile stress acting on the corner portions of the engaging piece becomes small when the ear portions collide with the ear accommodating portions.

Moreover, the angle of the corner portion may be formed into a right angle, and the angle of the edge portion is formed into an acute angle.

Accordingly, the selectable one-way clutch may make the ear portions collide with the side surfaces of the ear accommodating portions in the positions close to the corner portions in the engaging piece at the time of occurrence of the yaw moment. Therefore, the tensile stress acting on the corner portions of the engaging piece becomes small at the time of collision.

Moreover, the angle of the corner portion and the angle of the edge portion may be formed in acute angles, respectively.

Accordingly, the selectable one-way clutch may make the ear portions collide with the side surfaces of the ear accommodating portions in the positions close to the corner portions in the engaging piece at the time of occurrence of the yaw moment. Therefore, the tensile stress acting on the corner portions of the engaging piece becomes small at the time of collision.

Moreover, the angle of the corner portion may be formed into an obtuse angle, and the angle of the edge portion may be formed into a right angle.

Accordingly, the selectable one-way clutch may make the ear portions collide with the side surfaces of the ear accommodating portions in the positions close to the corner portions in the engaging piece at the time of occurrence of the yaw moment. Therefore, the tensile stress acting on the corner portions of the engaging piece becomes small at the time of collision.

Moreover, the angle of the corner portion may be formed into an obtuse angle, and the angle of the edge portion may be formed into an acute angle.

Accordingly, the selectable one-way clutch may make the ear portions collide with the side surfaces of the ear accommodating portions in the positions close to the corner portions in the engaging piece at the time of occurrence of the yaw moment. Therefore, the tensile stress acting on the corner portions of the engaging piece becomes small at the time of collision. Further, the angle of the corner portion of the selectable one-way clutch may be formed into an obtuse angle, and thus the manufacturability of the engaging piece may be improved as compared with a case where the angle of the corner portion is formed into a right angle or an acute angle.

Moreover, the angle of the corner portion and the angle of the edge portion may be formed into obtuse angles, respectively.

Accordingly, the selectable one-way clutch may make the ear portions collide with the side surfaces of the ear accommodating portions in the positions close to the corner portions in the engaging piece at the time of occurrence of the yaw moment. Therefore, the tensile stress acting on the corner portions of the engaging piece becomes small at the time of collision. Further, the angle of the corner portion and the angle of the edge portion of the selectable one-way clutch may be formed into obtuse angles, and thus the manufacturability of the engaging piece and the accommodating recess portion may be improved as compared with a case where the angle of the corner portion and the angle of the edge portion are formed into right angles or acute angles.

Moreover, the edge portion may have a shape including a plurality of arcs.

Accordingly, the selectable one-way clutch may make the ear portions collide with the side surfaces of the ear accommodating portions in the positions close to the corner portions in the engaging piece at the time of occurrence of the yaw moment. Therefore, a distance between a collision portion of the ear portion and the ear accommodating portion, and the corner portion of the engaging piece becomes short, and the tensile stress acting on the corner portions of the engaging piece becomes small at the time of collision.

Moreover, the edge portion may have a shape including a linear portion between the plurality of arcs.

Accordingly, the selectable one-way clutch may make the ear portions collide with the side surfaces of the ear accommodating portions in the positions close to the corner portions in the engaging piece at the time of occurrence of the yaw moment. Therefore, a distance between a collision portion of the ear portion and the ear accommodating portion, and the corner portion of the engaging piece becomes short, and the tensile stress acting on the corner portions of the engaging piece becomes small at the time of collision.

Moreover, the ear portion may include, in a side surface opposite to the side surface that configures the corner portion, a tapered portion inclined in a direction toward a tip end of the main body portion, and the ear accommodating portion includes, in a side surface coming in contact with the tapered portion of the ear portion, a tapered portion inclined in the same direction as the tapered portion of the ear portion.

Accordingly, the selectable one-way clutch may make the ear portions collide with the side surfaces of the ear accommodating portions in the positions close to the corner portions in the engaging piece at the time of occurrence of the yaw moment. Therefore, a distance between a collision portion of the ear portion and the ear accommodating portion, and the corner portion of the engaging piece becomes short, and the tensile stress acting on the corner portions of the engaging piece becomes small at the time of collision. Further, the selectable one-way clutch may be provided with the tapered portions in the ear portions, and thus does not need to include recess portions for allowing the ear portions to escape thereto, in the accommodating recess portion side. Therefore, the manufacturability of the accommodating recess portion may be improved.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A selectable one-way clutch comprising:
   a pocket plate including a plurality of accommodating recess portions formed in one surface;
   a plurality of engaging pieces accommodated in the respective accommodating recess portions;
   a notch plate relatively rotatable with respect to the pocket plate, and including a plurality of engaging recess portions formed in a surface facing the one surface of the pocket plate; and
   a selector plate positioned between the pocket plate and the notch plate, and configured to be coaxially rotated with the notch plate to switch between: a state in which the engaging pieces rise toward the engaging recess portions; and a state in which the engaging pieces are accommodated in the respective accommodating recess portions, wherein
   each of the engaging piece includes:
   a main body portion extending in a peripheral direction of the pocket plate;
   a pair of ear portions extending in opposite sides to each other along a radial direction of the pocket plate from end portions of the main body portion in the peripheral direction; and
   corner portions where the main body portion and the ear portions intersect,
   the accommodating recess portion includes:
   a main body accommodating portion extending in the peripheral direction of the pocket plate, and in which the main body portion is accommodated;
   a pair of ear accommodating portions extending in opposite sides to each other along the radial direction of the pocket plate from end portions of the main body accommodating portion in the peripheral direction, and in which the ear portions are accommodated; and
   edge portions where the main body accommodating portion and the ear accommodating portions intersect, and
   an angle of the edge portion is smaller than an angle of the corner portion, the angle of the edge portion indicating an angle made by a side surface of the main body accommodating portion and a side surface of the ear accommodating portion that configure the edge portion, and the angle of the corner portion indicating an angle made by a side surface of the main body portion and a side surface of the ear portion that configure the corner portion, wherein
   the edge portion has a shape including a plurality of arcs formed of different radius of curvatures.

2. The selectable one-way clutch according to claim 1, wherein the angle of the corner portion is formed into a right angle, and the angle of the edge portion is formed into an acute angle.

3. The selectable one-way clutch according to claim 1, wherein the angle of the corner portion and the angle of the edge portion are formed in acute angles, respectively.

4. The selectable one-way clutch according to claim 1, wherein the angle of the corner portion is formed into an obtuse angle, and the angle of the edge portion is formed into a right angle.

5. The selectable one-way clutch according to claim 1, wherein the angle of the corner portion is formed into an obtuse angle, and the angle of the edge portion is formed into an acute angle.

6. The selectable one-way clutch according to claim 1, wherein the angle of the corner portion and the angle of the edge portion are formed into obtuse angles, respectively.

7. The selectable one-way clutch according to claim 1, wherein the edge portion has a shape including a linear portion between the plurality of arcs.

8. The selectable one-way clutch according to claim 1, wherein the ear portion includes, in a side surface opposite to the side surface that configures the corner portion, a tapered portion inclined in a direction toward a tip end of the main body portion, and the ear accommodating portion includes, in a side surface coming in contact with the tapered portion of the ear portion, a tapered portion inclined in the same direction as the tapered portion of the ear portion.

* * * * *